US010112763B1

(12) United States Patent
Castillo

(10) Patent No.: US 10,112,763 B1
(45) Date of Patent: Oct. 30, 2018

(54) SCOOP WITH LEVELER AND DOCKING SYSTEM

(71) Applicant: Mead Johnson Nutrition Company, Chicago, IL (US)

(72) Inventor: Wilfred L. Castillo, Newburgh, IN (US)

(73) Assignee: Mead Johnson Nutrition Company, Chicago, IL (US)

( * ) Notice: Subject to any disclaimer, the term of this patent is extended or adjusted under 35 U.S.C. 154(b) by 0 days.

(21) Appl. No.: 15/499,245

(22) Filed: Apr. 27, 2017

(51) Int. Cl.
*B65D 77/24* (2006.01)
*B65B 1/04* (2006.01)
*B65D 85/00* (2006.01)

(52) U.S. Cl.
CPC .............. *B65D 77/245* (2013.01); *B65B 1/04* (2013.01); *B65D 85/70* (2013.01)

(58) Field of Classification Search
CPC ...... B65D 77/22–77/245; B65D 85/00–85/70; B65B 1/00–1/04
USPC ................................................ 220/694–89.4
See application file for complete search history.

(56) References Cited

U.S. PATENT DOCUMENTS

| 1,607,865 | A | * | 11/1926 | Butler | ................... | B65D 51/246 |
| | | | | | | 206/229 |
| 8,651,311 | B1 | * | 2/2014 | Drummond | .......... | B65D 51/247 |
| | | | | | | 206/223 |
| 9,669,964 | B2 | * | 6/2017 | Vogel | ..................... | B65D 23/12 |
| 2007/0102061 | A1 | * | 5/2007 | Tsao | ..................... | B65D 77/245 |
| | | | | | | 141/380 |
| 2014/0299567 | A1 | * | 10/2014 | Vogel | ..................... | B65D 23/12 |
| | | | | | | 215/44 |

FOREIGN PATENT DOCUMENTS

WO        2014099369 A1    6/2014

* cited by examiner

*Primary Examiner* — Kareen Thomas
(74) *Attorney, Agent, or Firm* — James R. Cartiglia; OspreyIP, pllc

(57) ABSTRACT

The present disclosure relates generally to device comprising a scaffold, a scoop leveler and a scoop. The device may be manufactured in one or two pieces, by, e.g., injection molding. The device can be placed into a container where it is retained toward the top of the container. The container can be filled with flowable product, e.g., a granular substance such as a powder. The device's position toward the top of the container allows the device to stay above the product so that the scoop is easily located by a user.

13 Claims, 3 Drawing Sheets

SCOOP WITH LEVELER AND DOCKING SYSTEM

TECHNICAL FIELD

The present disclosure relates generally to a device comprising a scoop, a scoop leveler and a scaffold. The device may be manufactured in a single piece or in two pieces, by, e.g., single or two component injection molding. The device can be inserted into a container and retained toward the top of the container. The container can be filled with flowable product, e.g., a granular substance such as a powder. The device's position toward the top of the container allows the device to stay above the product so that the scoop is easily located by a user.

BACKGROUND

Many products exist in granular or powdered form that are stored and sold in containers and must be measured out in appropriate amounts for preparing foods, drinks, etc. These products include infant formula, flour, coffee, sugar and nutritional supplements, such as protein or dietary supplements. Some containers include a measuring device or scoop which allows a user to remove the product from the container, and, in certain circumstances, measure and dispense the amount of product needed for each use.

However, scoops can become buried in the powder, making it difficult for a user to find. Further, a user risks contaminating the powder by reaching into it with his hand to retrieve the scoop. Although scoop docking stations are found in prior art containers, they often require the use of a flip-top lid, which is expensive to manufacture compared to, for example, a snap cap.

Accordingly, there is a need in the art for a scoop and docking system that can be cost-effectively manufactured and used with snap cap container.

BRIEF SUMMARY

The disclosure relates to a device comprising a scaffold, a scoop leveler and a scoop. The device can be inserted into a container and retained toward the top of the container, e.g., via frictional force. The container can be filled with flowable product, e.g., a granular substance such as a powder, before or after the device is inserted. The device's position toward the top of the container allows the device to stay above the product so that the scoop is easily located by a user.

In certain embodiments, the device is manufactured as one or two pieces, e.g., by an injection molding process. Manufacture of the device as a one or two pieces, especially via an injection molding process, allows for automated insertion of the device into a container while maintaining good manufacturing processes (GMP) status of the container and/or any additional packaging material. In addition, the device is more cost-effective than prior art containers comprising a scoop and docking station, because it can be inserted into a less-expensive, snap cap container with little or no modification to the existing container.

Accordingly, the disclosure relates to a device comprising a scoop, scoop leveler, and scaffold, manufactured as one or two pieces for insertion into a container. The scoop comprises a bucket and a handle. The scoop leveler comprises a substantially straight edge configured to face the interior of the container when inserted therein, wherein the scoop leveler is integrally connected to the scaffold at a least one point. The scoop is frangibly attached to the scaffold or to the scoop leveler.

In certain embodiments, the scaffold comprises two flexible prongs capable of holding the scaffold in the container by tensional force. In certain embodiments, the scaffold is U-shaped prior to insertion into the container and becomes semi-circular upon insertion into the container.

In certain embodiments, the scoop leveler is integrally connected to the scaffold at at least two points along an arc ranging from about 60 degrees to about 110 degrees, from about 70 degrees to about 100 degrees, or from about 80 to about 90 degrees.

In certain embodiments, the scoop is frangibly attached to the scoop leveler. In certain embodiments, the scoop is frangibly attached to the scaffold or the scoop leveler at the bucket of the scoop. In certain embodiments, the scoop further comprises a clip or a pinch device that is attachable to the scaffold or the scoop leveler following the detachment of the scoop from the device. In certain embodiments, the scaffold or the scoop leveler further comprises a clip or a pinch device that is attachable to the scoop following the detachment of the scoop from the device.

In certain embodiments, the device is manufactured by an injection molding process.

The disclosure further relates to a containment system comprising a device manufactured as one or two pieces comprising a scoop, scoop leveler, and scaffold, and a container. The scoop comprises a bucket and a handle. The scoop leveler comprises a substantially straight edge facing the interior of the container, wherein the scoop leveler is integrally connected to the scaffold. The scoop is frangibly attached to the scaffold or the scoop leveler. In certain embodiments, the containment system further comprises a flowable product.

The disclosure also relates to a method of manufacturing a container comprising a device comprising a scoop, scoop leveler, and scaffold, manufactured as one or two pieces, the method comprising inserting the device into the container and filling the container with a flowable substance. The device can be inserted first and then the container filled with a flowable substance. In another embodiment, the container is filled first and then the device is inserted. The device is positioned above the flowable substance in the container.

DETAILED DESCRIPTION

Figure 1:
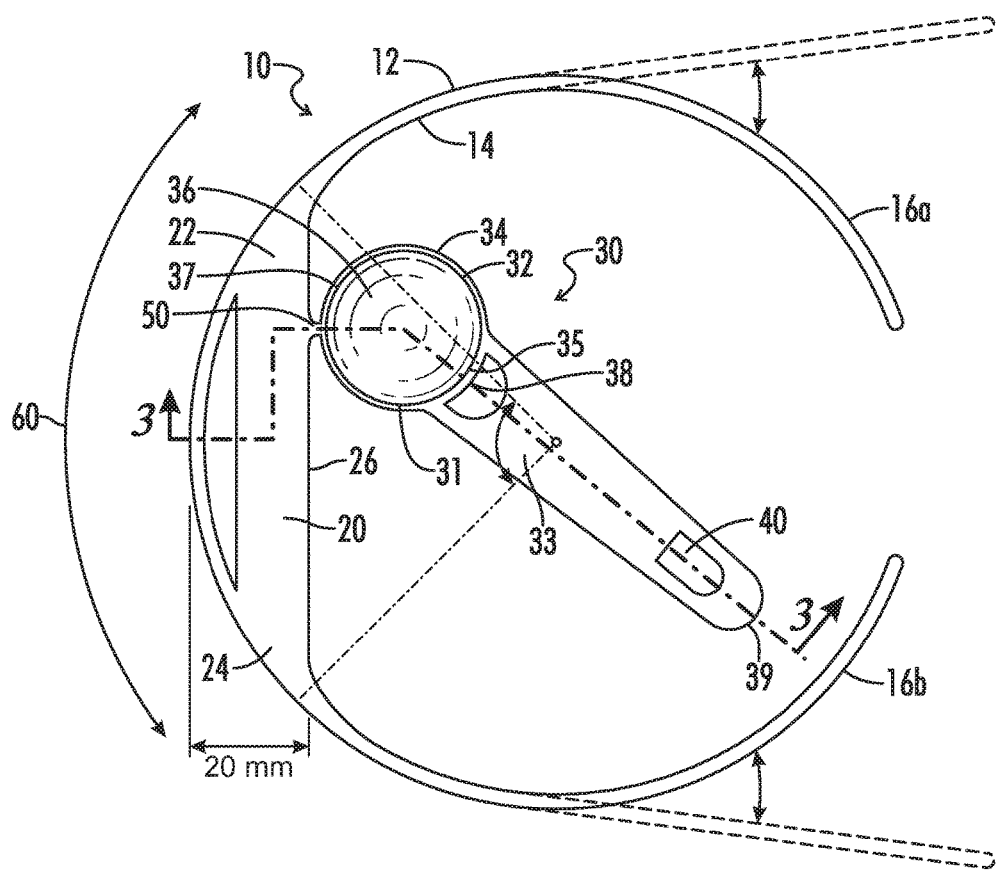
FIG. 1 is a top view of the device of the invention, comprising a scaffold, scoop and scoop leveler.

Reference now will be made in detail to the embodiments of the present disclosure. It will be apparent to those of ordinary skilled in the art that various modifications and variations can be made to the teachings of the present disclosure without departing from the scope of the disclosure. For instance, features illustrated or described as part of one embodiment, can be used with another embodiment to yield a further embodiment.

Thus, it is intended that the present disclosure covers such modifications and variations as come within the scope of the appended claims and their equivalents. Other objects, features and aspects of the present disclosure are disclosed in or are apparent from the following detailed description. It is to be understood by one of ordinary skill in the art that the present disclosure is a description of exemplary embodiments only and is not intended as limiting the broader aspects of the present disclosure.

For the sake of clarity, not all reference numerals are necessarily present in each drawing Figure. In addition, positional terms such as "upper," "lower," "side," "top," "bottom," "vertical," "horizontal," etc. refer to the measuring device when in the orientation shown in the drawings. The skilled artisan will recognize that a measuring device can assume different orientations when in use.

The disclosure relates to a device, as shown in FIG. 1, comprising a scaffold 10, a scoop leveler 20 and a scoop 30. The device can be placed into a container where it is retained toward the top of the container. The container can be filled with flowable product, e.g., a granular substance such as a powder, before or after insertion of the device. The device's position toward the top of the container allows the device to stay above the product so that the scoop is easily located by a user. The device may be made from any plastic, for example, from polypropylene or from high-density polyethylene. Other exemplary plastics include polyethylene copolymers, polypropylene, polypropylene copolymers, polyethylene terephthalate, polyvinylcyclohexane and blends thereof. In certain embodiments, one or more of the aforementioned plastics may be layered with thermoplastic elastomers.

In certain embodiments, the flowable product is flour, coffee, sugar or a nutritional supplement, such as a protein or other dietary supplement. In certain embodiments, the flowable product is a pediatric nutritional composition. In certain embodiments, the pediatric nutritional composition is an infant formula or a growing-up milk. In certain embodiments, the pediatric nutritional composition (e.g., infant formula or growing-up milk) is liquid or powdered.

The device may be manufactured in one or two pieces, e.g., by an injection molding process. In certain embodiments, the device is manufactured in more than two pieces. Manufacture of the device as one or two pieces allows for automated insertion of the device into a container while maintaining good manufacturing processes (GMP) status of the container and/or any additional packaging material. In addition, the device is more cost-effective than prior art containers comprising a scoop and docking station (e.g., flip-top containers), because it can be inserted into a less-expensive, existing snap cap container with little or no modification of the existing container.

The scaffold 10 comprises an outer perimeter 12 and an inner perimeter 14. In certain embodiments, the outer perimeter 12 of the scaffold 10 is connected to the inner wall of a container by flexible prongs. The prongs may be, e.g., tension prongs or interlocking prongs. In certain embodiments, the scaffold 10 comprises two flexible prongs 16a and 16b that permit the device to be retained along the inside wall of a container by tensional force. In certain embodiments, the scaffold is substantially U-shaped and becomes substantially circular or semi-circular when the flexible prongs are pressed against the inside wall of the container into which it is inserted. In certain embodiments, the prongs may be interlocking prongs, as long as they provide the tensional force necessary to retain the scaffold on the inside of the container. The scaffold 10 can be any shape as long as it is capable of being retained in the container above the level of the product in the container.

Figure 2:
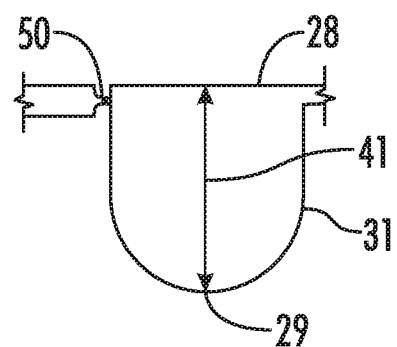
FIG. 2 is an elevation view of an edge of a scoop leveler frangibly attached to the bucket of a scoop with a break-away tab.

The scoop 30 comprises a bucket 31 and a handle 33. As shown in FIG. 1, the bucket 31 has an inner circumference 32, an outer circumference 34, and an opening 36. As shown in FIG. 2, the bucket 31 has a top 28, a bottom 29, and a depth 41. The scoop 30 holds the product after the user scoops it from the container. The cross-sectional area of the scoop 30 (and inner 32 and outer 34 circumferences) can be any shape, as long as the shape allows for the scooping of product out of a container. In certain embodiments, the cross-sectional area of the scoop 30 (and inner 32 and outer 34 circumferences) is substantially circular. The inner circumference 32 and depth 41 relate to the amount of product the scoop 30 is able to hold, which may be adjusted according to the amount of product to be dispensed. In certain embodiments, the scoop 30 has a small hole (not shown) at the bottom 29 of the scoop 30, wherein the hole is too small for product to fall out, but permits air to flow into the scoop 30 as the user is dumping the product, allowing the product to flow out of the top 28 of the bucket 31.

As shown in FIG. 2, the bucket 31 has a handle side 35 and an oppositely facing distal side 37. The scoop has a handle 33 connected to the handle side 35 of the bucket 31. The handle 33 has a bucket end 38, and an oppositely facing distal end 39. The user holds the scoop by the handle 33. The handle 33 can be ergonomic for ease in scooping, measuring and dispensing product. In certain embodiments, the scoop 30 comprises a clip 40 which allows the scoop 30 to dock onto the leveler 20. In a preferred embodiment, shown in FIGS. 1, 3, and 4, the clip 40 is positioned on the handle 33 toward the distal end 39. In certain embodiments, a pinch device may be used to docket the scoop onto the leveler. In an alternative embodiment (not shown), the scoop leveler or scaffold can comprise a clip or a pinch device allowing the scoop handle to dock onto scoop leveler.

As shown in FIG. 1, the scoop leveler 20 is integratedly connected to the inner perimeter 14 of the scaffold 10 at at least one point 22. Preferably, the scoop level is integratedly connected to the inner perimeter of the scaffold at at least two points 22, 24 to provide sufficient stability to resist the force of the scoop 30 when the scoop 30 is being leveled. The scoop leveler 20 may be any shape as long as it comprises at least one substantially straight edge 26 that, when the device has been inserted into a container, faces the interior of the container to allow a user to scrape excess powder from the bucket 31 of the scoop 30, thereby ensuring that the powder is level at the top 28 of the bucket 31. In certain embodiments, the entire edge 26 of the scoop leveler 20 is located within 20 mm of the scaffold 10 of the device.

In certain embodiments, the scoop leveler 20 is integrally connected to the scaffold at at least two points along an arc 60 ranging from about 60 degrees to about 110 degrees around the scaffold 10. In certain embodiments, the scoop leveler is integrally connected to the scaffold at at least two points along an arc 60 ranging from about 70 degrees to about 100 degrees around the scaffold 10. In certain embodiments, the scoop leveler is integrally connected to the scaffold at at least two points 22, 24 along an arc 60 ranging from about 80 degrees to about 90 degrees around the scaffold 10. In certain embodiments, as shown in FIG. 1, the scoop leveler is integrally connected to the scaffold at at least two points along a 90 degree arc 60. In certain embodiments (not shown), the connection between the scaffold 10 and the leveler 20 is contiguous along the arc 60 (i.e., the scoop leveler is integrally connected to the scaffold at all points along the arc 60).

Figure 3:
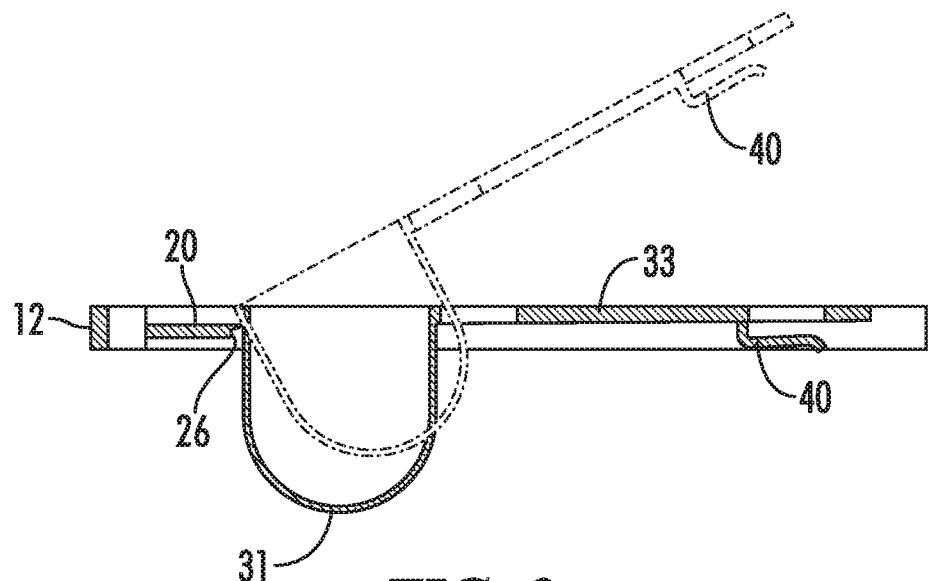
FIG. 3 is a cross-sectional view showing a scoop being lifted up to break the break-away tab which frangibly connects the bucket of a scoop with a scoop leveler.
Figure 4:
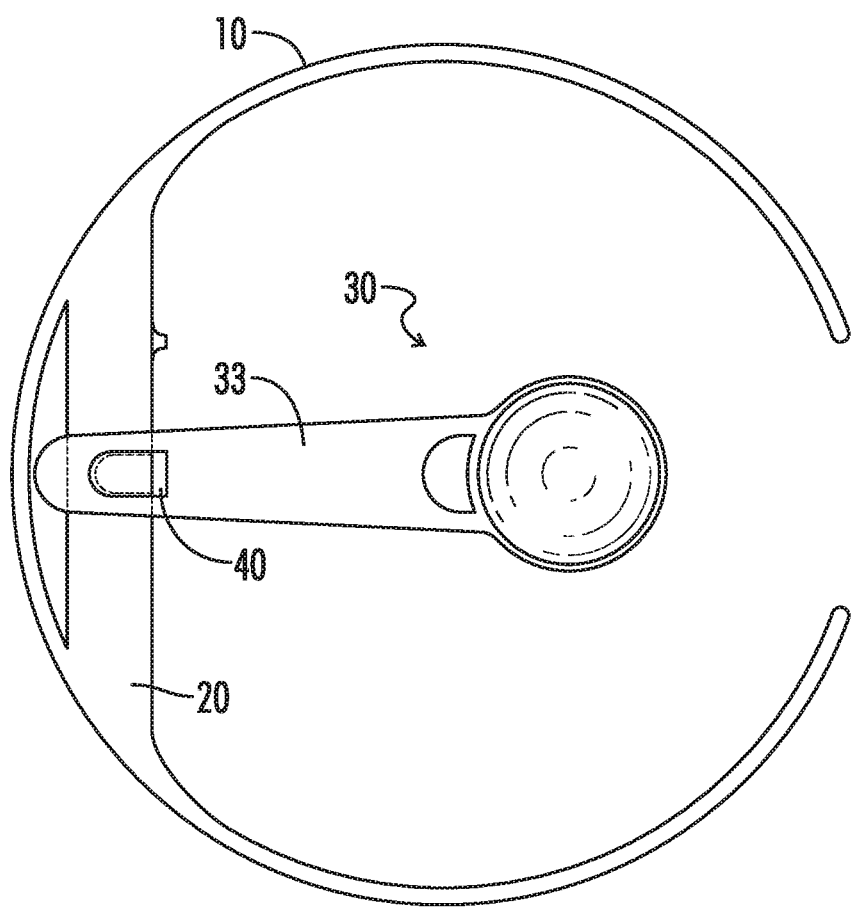
FIG. 4 is a top view of the device of the invention, wherein the scoop has been removed from its frangible attachment and docked onto the scoop leveler via a clip on the scoop's handle.

The scoop is frangibly attached to the device via a break-away tab 50, as shown in FIGS. 1 and 2, before its first use. The break-away tab can be of any thickness as long as a user can easily manually break the break-away tab to separate the scoop from the rest of the device. The break-away tab can be less than about 0.5 mm thick at its narrowest point, less than about 0.4 mm thick, less than about 0.3 mm thick, less than about 0.2 mm thick, or less than about 0.1 mm thick). The scoop 36 can be frangibly attached to the inner perimeter 14 of the scaffold 10 or to the scoop leveler 20. In a preferred embodiment, shown in FIG. 1, the scoop 33 is frangibly attached to the scoop leveler 20. The point of frangible attachment to the scoop 30 can be at the outer circumference 34 of the bucket 31, as shown in FIG. 1, or at the handle 33 of the scoop 30 (not shown). Preferably, the point of frangible attachment to the scoop 30 is at the outer circumference 34 of the bucket 31, such that a user can lift the handle 33 to break the frangible attachment and free the scoop 30 before its first use, as shown in FIG. 3.

The disclosure also relates to a containment system and method of making the same. The containment system comprises a device as described herein, inserted into a container. In certain embodiments, the disclosure relates to a method of manufacturing a containment system comprising a device as described herein, the method comprising inserting the device into the container, filling the container with a flowable substance up to a point that is below the device, such that the device is positioned above the flowable substance so that a user can access the scoop without touching the powder. The device can be inserted before or after the flowable substance is added to the container. The device can be inserted into the container by applying pressure to the flexible prongs (e.g., manually or mechanically), inserting the device into the container, and releasing the flexible prongs so that the device is retained toward the top of the container due to the tensional force of the flexible prongs on the inner wall of the container. The exact position of the device toward the top of the container is not crucial, so long as the device is situated above the contents of the container. For example, the device may be placed within the upper half of the container, the upper quarter of the container, or the upper tenth of the container. The positioning of the device above the powder prevents powder from soiling a user's hand, and also prevents contamination of the powder from a user's hand.

Although embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. Therefore, the spirit and scope of the appended claims should not be limited to the description of the versions contained therein.

Thus, although there have been described particular embodiments of the present invention of a new device, it is not intended that such references be construed as limitations upon the scope of this invention except as set forth in the following claims.

What is claimed is:

1. A device comprising a scoop, scoop leveler, and scaffold, manufactured as one or two pieces for insertion into a container, wherein
    the scoop comprises a bucket and a handle;
    the scoop leveler comprises a substantially straight edge positioned to face the interior of the container when inserted therein; and
    wherein the scoop leveler is integrally connected to the scaffold; and
    the scoop is frangibly attached to the scaffold or the scoop leveler and further wherein the scaffold is U-shaped prior to insertion into the container and becomes semi-circular upon insertion into the container.

2. The device of claim 1, wherein the scaffold comprises two flexible prongs capable of holding the scaffold in the container by tensional force.

3. The device of claim 1, wherein the scoop leveler is integrally connected to the scaffold at at least two points along an arc ranging from about 60 degrees to about 110 degrees.

4. The device of claim 3, wherein the arc ranges from about 70 degrees to about 100 degrees.

5. The device of claim 4, wherein the arc ranges from about 80 to about 90 degrees.

6. The device of claim 1, wherein the scoop is frangibly attached to the scoop leveler.

7. The device of claim 1, wherein the scoop is frangibly attached to the scaffold or the scoop leveler at the bucket of the scoop.

8. The device of claim 1, wherein the scoop further comprises a clip or a pinch device that is attachable to the scaffold or the scoop leveler following the removal of the scoop from the device.

9. The device of claim 1, wherein the scaffold or the scoop leveler further comprises a clip or a pinch device that is attachable to the scoop.

10. The device of claim 1, wherein the device is manufactured by an injection molding process.

11. A containment system comprising the device of claim 1 and a container.

12. The containment system of claim 6, further comprising a flowable product.

13. A method of manufacturing a container comprising a the device of claim 1, the method comprising, in any order:
    Inserting the device of claim 1 into the container,
    filling the container with a flowable substance,
        wherein the device is positioned above the flowable substance in the container.

* * * * *